(12) United States Patent
Young et al.

(10) Patent No.: US 10,243,479 B2
(45) Date of Patent: *Mar. 26, 2019

(54) POWER HARVESTING CIRCUIT AND APPLICATIONS THEREOF

(71) Applicant: RFMicron, Inc., Austin, TX (US)

(72) Inventors: Brian David Young, Austin, TX (US);
Shahriar Rokhsaz, Austin, TX (US);
Ahmed Younis, San Antonio, TX (US);
Marwan Hassoun, Austin, TX (US)

(73) Assignee: RFMicron, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,625

(22) Filed: Sep. 18, 2017

(65) Prior Publication Data
US 2018/0006572 A1    Jan. 4, 2018

Related U.S. Application Data

(63) Continuation of application No. 15/154,510, filed on May 13, 2016, now Pat. No. 9,768,707, which is a continuation-in-part of application No. 13/732,263, filed on Dec. 31, 2012, now Pat. No. 9,716,441.

(60) Provisional application No. 62/161,849, filed on May 14, 2015, provisional application No. 62/162,975, filed on May 18, 2015, provisional application No. 61/583,245, filed on Jan. 5, 2012.

(51) Int. Cl.
*H02M 7/06* (2006.01)
*H02M 1/00* (2006.01)

(52) U.S. Cl.
CPC ...... *H02M 7/06* (2013.01); *H02M 2001/0006* (2013.01)

(58) Field of Classification Search
None
See application file for complete search history.

(56) References Cited

U.S. PATENT DOCUMENTS

| | | | | |
|---|---|---|---|---|
| 4,673,886 A * | 6/1987 | Bickley | ...................... | H03F 3/19 330/145 |
| 4,777,580 A * | 10/1988 | Bingham | ............ | H01L 27/0814 257/E27.051 |
| 2008/0030285 A1* | 2/2008 | Gurov | ........................ | H01P 1/15 333/104 |
| 2010/0277839 A1* | 11/2010 | Nicholson | ................ | G01R 1/36 361/54 |
| 2013/0207738 A1* | 8/2013 | Mason | .............. | H01J 37/32183 333/32 |

* cited by examiner

Primary Examiner — Jeffrey A Gblende
(74) Attorney, Agent, or Firm — Garlick & Markison; Timothy W. Markison

(57) ABSTRACT

A power harvesting circuit, a rectifier circuit and a capacitor. The rectifier circuit includes a diode circuit and a diode voltage reduction circuit. The diode circuit passes a current when a received RF signal has a first polarity and to substantially blocks the current when the received RF signal has a second polarity. The diode voltage reduction circuit is operably coupled to reduce a voltage drop of the diode circuit. The capacitor is operably coupled to convert the rectified signal into a DC supply voltage.

20 Claims, 9 Drawing Sheets

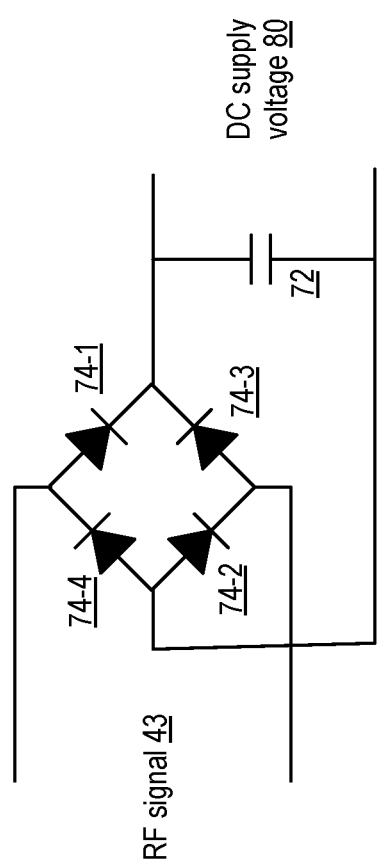

POWER HARVESTING CIRCUIT AND APPLICATIONS THEREOF

CROSS REFERENCE TO RELATED PATENTS

The present U.S. Utility Patent Application claims priority pursuant to 35 U.S.C. § 120 as a continuation of U.S. Utility application Ser. No. 15/154,510, entitled "POWER HARVESTING CIRCUIT AND APPLICATIONS THEREOF", filed May 13, 2016, issuing as U.S. Pat. No. 9,768,707 on Sep. 19, 2017, which claims priority pursuant to 35 U.S.C. § 119(e) to U.S. Provisional Application No. 62/161,849, entitled "METHOD AND APPARATUS FOR AC TO DC VOLTAGE CONVERSION", filed May 14, 2015; and U.S. Provisional Application No. 62/162,975, entitled "RFID TAGS AND SENSORS", filed May 18, 2015, all of which are hereby incorporated herein by reference in their entirety and made part of the present U.S. Utility Patent Application for all purposes.

U.S. Utility patent application Ser. No. 15/154,510 also claims priority pursuant to 35 U.S.C. § 120 as a continuation-in-part of U.S. Utility application Ser. No. 13/732,263, entitled "AC-TO-DC CHARGE PUMP HAVING A CHARGE PUMP AND COMPLIMENTARY CHARGE PUMP", filed Dec. 31, 2012, now U.S. Pat. No. 9,716,441, issued Jul. 25, 2017, which claims priority pursuant to 35 U.S.C. § 119(e) to U.S. Provisional Application No. 61/583,245, entitled "METHOD AND APPARATUS FOR VARYING AN IMPEDANCE", filed Jan. 5, 2012.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to wireless communications more particularly to power harvesting.

Description of Related Art

Wireless communication systems are known to include wireless transceivers that communication directly and/or over a wireless communication infrastructure. In direct wireless communications, a first wireless transceiver includes baseband processing circuitry and a transmitter to convert data into a wireless signal (e.g., radio frequency (RF), infrared (IR), ultrasound, near field communication (NFC), etc.). Via the transmitter, the first wireless transceiver transmits the wireless signal. When a second wireless transceiver is in range (e.g., is close enough to the first wireless transceiver to receive the wireless signal at a sufficient power level), it receives the wireless signal via a receiver and converts the signal into meaningful information (e.g., voice, data, video, audio, text, etc.) via baseband processing circuitry. The second wireless transceiver may wirelessly communicate back to the first wireless transceiver in a similar manner.

Examples of direct wireless communication (or point-to-point communication) include walkie-talkies, Bluetooth, ZigBee, Radio Frequency Identification (RFID), etc. As a more specific example, when the direct wireless communication is in accordance with RFID, the first wireless transceiver may be an RFID reader and the second wireless transceiver may be an RFID tag.

For wireless communication via a wireless communication infrastructure, a first wireless communication device transmits a wireless signal to a base station or access point, which conveys the signal to a wide area network (WAN) and/or to a local area network (LAN). The signal traverses the WAN and/or LAN to a second base station or access point that is connected to a second wireless communication device. The second base station or access point sends the signal to the second wireless communication device. Examples of wireless communication via an infrastructure include cellular telephone, IEEE 802.11, public safety systems, etc.

In many situations, direct wireless communication is used to gather information that is then communicated to a computer. For example, an RFID reader gathers information from RFID tags via direct wireless communication. At some later point in time (or substantially concurrently), the RFID reader downloads the gathered information to a computer via a direct wireless communication or via a wireless communication infrastructure.

In many RFID systems, the RFID tag is a passive component. As such, the RFID tag has to generate one or more supply voltages from the RF signals transmitted by the RFID reader. Accordingly, a passive RFID tag includes a power supply circuit that converts the RF signal (e.g., a continuous wave AC signal) into a DC power supply voltage. The power supply circuit includes one or more diodes and one or more capacitors. The diode(s) function to rectify the AC signal and the capacitor(s) filter the rectified signal to produce the DC power supply voltage.

The magnitude of the DC power supply voltage is a function of the peak voltage of the AC signal (Vpeak) and of the voltage drop of the diodes (Vdiode). For example, if one diode is used, the DC power supply voltage is approximately equal to Vpeak−Vdiode. The diode is a necessary component of the power supply circuit, but its voltage drop decreases the efficiency of the overall power supply circuit.

Techniques have developed to decrease the effective voltage drop of the diodes by using field effect transistors (FET) for the diodes and using voltage drop compensation circuits. For example, the compensation circuit includes a mirroring transistor of a smaller geometry coupled to the FET to reduce the "on" resistance and voltage of the FET, thereby effectively reducing its voltage drop and increasing the efficiency of the power supply circuit.

The voltage drop compensation circuits, however, only have a limited affect on increasing the efficiency of the power supply circuit since the compensation circuit requires a start up current to turn on the mirroring transistor. In addition, for the compensation circuit to start, the peak voltage of the AC signal needs to be at a high enough level to turn on the mirroring transistor. This requirement adds an element of delay in powering up a passive RFID tag.

BRIEF DESCRIPTION OF THE SEVERAL VIEWS OF THE DRAWING(S)

FIG. 9 is a schematic block diagram of another example embodiment of a power harvesting circuit in accordance with the present invention.

DETAILED DESCRIPTION OF THE INVENTION

Figure 1:
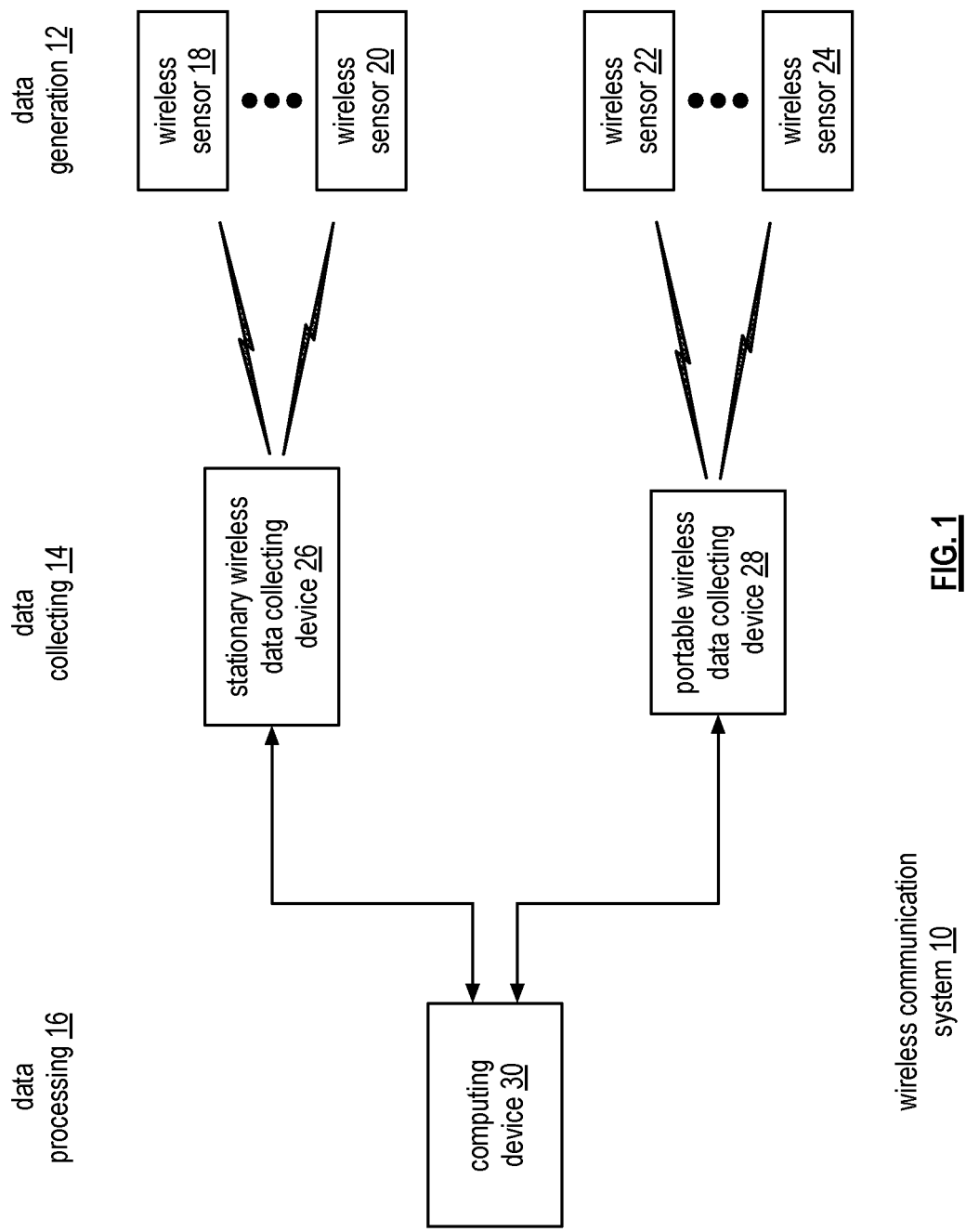
FIG. 1 is a schematic block diagram of an embodiment of a wireless communication system in accordance with the present invention.

FIG. 1 is a schematic block diagram of an embodiment of a wireless communication system 10 that includes three categories of devices: data generation 12, data collecting 14, and data processing 16. As shown, the data generation category 12 includes wireless sensors 18-24. The wireless sensors 18-24 may be implemented in a variety of ways to achieve a variety of data generation functions. For example, a wireless sensor includes a passive RFID topology and a sensing feature to sense one or more environmental conditions (e.g., moisture, temperature, pressure, humidity, altitude, sonic wave (e.g., sound), human contact, surface conditions, tracking, location, etc.) associated with an object (e.g., a box, a personal item (e.g., clothes, diapers, etc.), a pet, an automobile component, an article of manufacture, an item in transit, etc.). As another example, the wireless sensor includes an active RFID topology and a sensing feature. As yet another example, the wireless sensor includes processing circuitry and a transceiver for use with a personal area network (e.g., Bluetooth), a local area network (e.g., WiFi, local wireless area network), and/or a wide area network (e.g., cellular voice and/or data).

The data collecting category 14 includes stationary wireless collecting devices 26 and/or portable wireless data collecting devices 28. The construct of a wireless collecting device 26 and/or 28 is at least partially depended on the data generation devices of category 12. For example, when a wireless sensor includes an RFID topology, the wireless data collecting device 26 and/or 28 is an RFID reader. As a specific example, the portable data collecting device 28 is a hand-held RFID reader and the stationary wireless collecting device 26 is a RFID reader mounted in a particular location (e.g., on an assembly line of a manufacturing process).

In general, the wireless sensors 18-24 generate data that is wireless communicated to the wireless data collecting devices 26 and/or 28. A wide variety of wireless communication protocols and/or standards may be used. For example, the wireless communication is in accordance with one or more RFID wireless communication standards and/or protocols. As another example, the wireless communication is in accordance with Bluetooth, ZigBee, IEEE 802.11, etc.

The data processing category 16 includes one or more computing devices 30. The computing device 30 may be a personal computer, a tablet computer, a laptop, a mainframe computer, and/or a server. The computing device 30 communicates with the wireless data collecting devices via a wired and/or wireless local area network, wide area network, or point-to-point network.

As an example, the wireless communication system 10 is deployed in a factory that assemblies a product from multiple components in multiple stages occurring in multiple locations within the factory. Each of the components includes a wireless sensor that identifies the component and may further generate data regarding one or more environmental conditions of the component. In some locations within the factory, stationary wireless data collecting devices are positions to communicate with the wireless sensors in its proximal area. In other locations of the factory, employees use the portable data collecting devices 28 to communication with the wireless sensors in its proximal area.

As the wireless data collecting devices 26 and 28 communicate with the wireless sensors 18-24, they collect data from the sensors and relay the data to the computing device 30. The computing device processes the data to determine a variety of information regarding the assembly of the products, defects, efficiency, etc.

While the categories 12-16 of the wireless communication system are shown to have separate devices, a device may span multiple categories. For example, a data collecting device includes functionality to process at least some of the data it collects. As another example, a wireless sensor includes functionality to store and/or interpret the data it is collecting.

Figure 2:
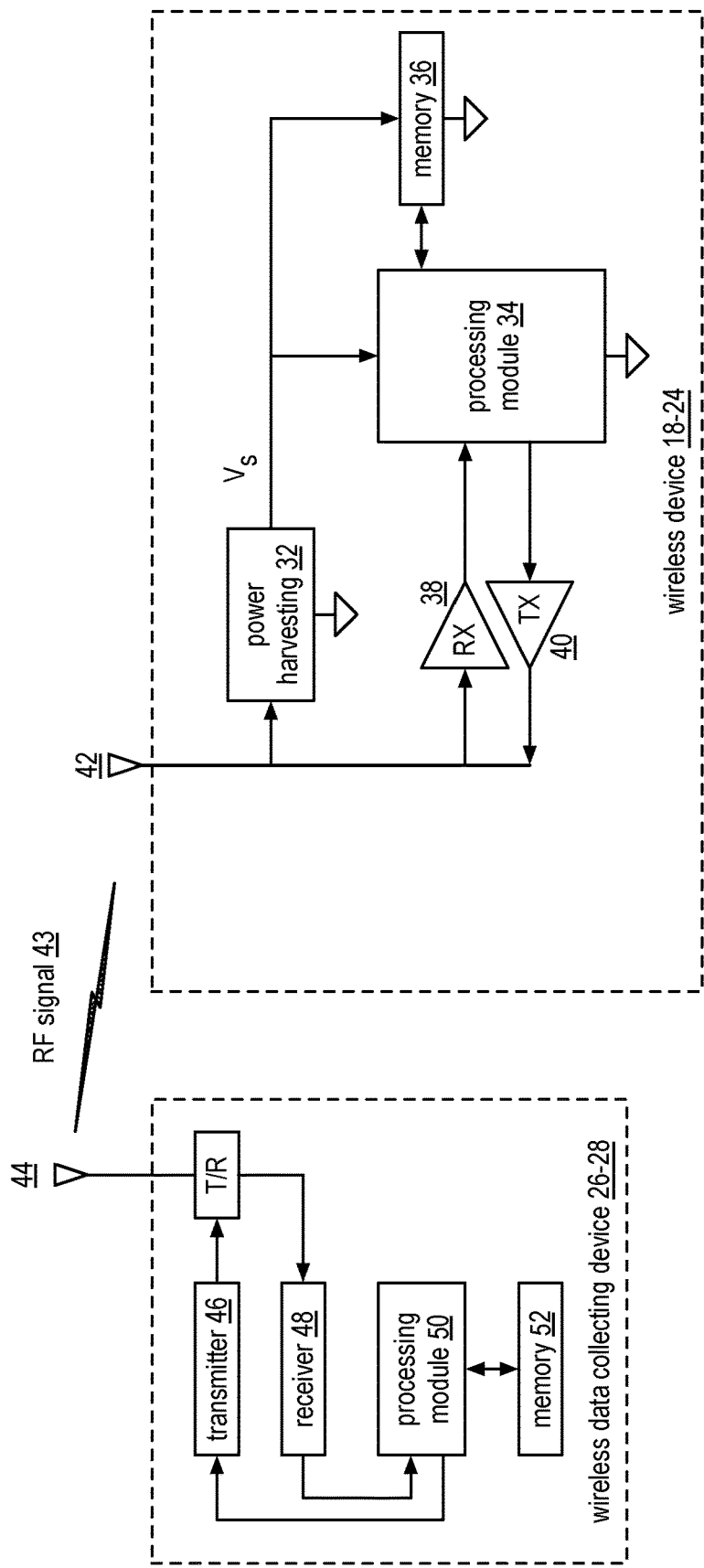
FIG. 2 is a schematic block diagram of an embodiment of a wireless data collecting device and a wireless device in accordance with the present invention.

FIG. 2 is a schematic block diagram of an embodiment of a wireless data collecting device 26-28 and a wireless device 18-24. The wireless device 18-24 includes a power harvesting circuit 32, a processing module 34, memory 36, a receiver section 38, a transmitter section 40, and an antenna structure 42. The wireless data collecting device includes an antenna structure 44, a transmitter 46, a receiver 48, a transmit/receive splitter or switch (T/R), a processing module 50, and memory 52.

In an example of operation, the wireless sensor is a passive RFID tag and the wireless data collecting device is an RFID reader. The passive RFID tag is associated with an object and an object identifier is stored in the memory 36 of the wireless device. For the RFID reader to communicate with the passive RFID tag, the tag first generates a power supply voltage (or multiple power supply voltages) from the RF (radio frequency) signal 43 transmitted from the RFID reader. For example, the RF signal 43 is a continuous wave signal and uses amplitude shift keying (ASK) or other amplitude-based modulation scheme to convey data.

The power harvesting circuit 32 receives the RF signal 43 via the antenna 42 and converts it into one or more supply voltages (Vs). The supply voltage(s) power the other components (e.g., 34-40) so that they perform their specific tasks. For instance, the receiver 38 is operable to convert an inbound message received from the RFID reader into a baseband signal that it provides to the processing module 34. The processing module 34 processes the baseband signal and, when appropriate, generates a response that is subsequently transmitted via the antenna 42 by the transmitter 40. For example, the inbound message instructs the wireless device to respond with the stored ID of the object associated with the wireless device. The power harvesting circuit 32 will be described in greater detail with reference to one or more of FIGS. 4-9.

Figure 3:
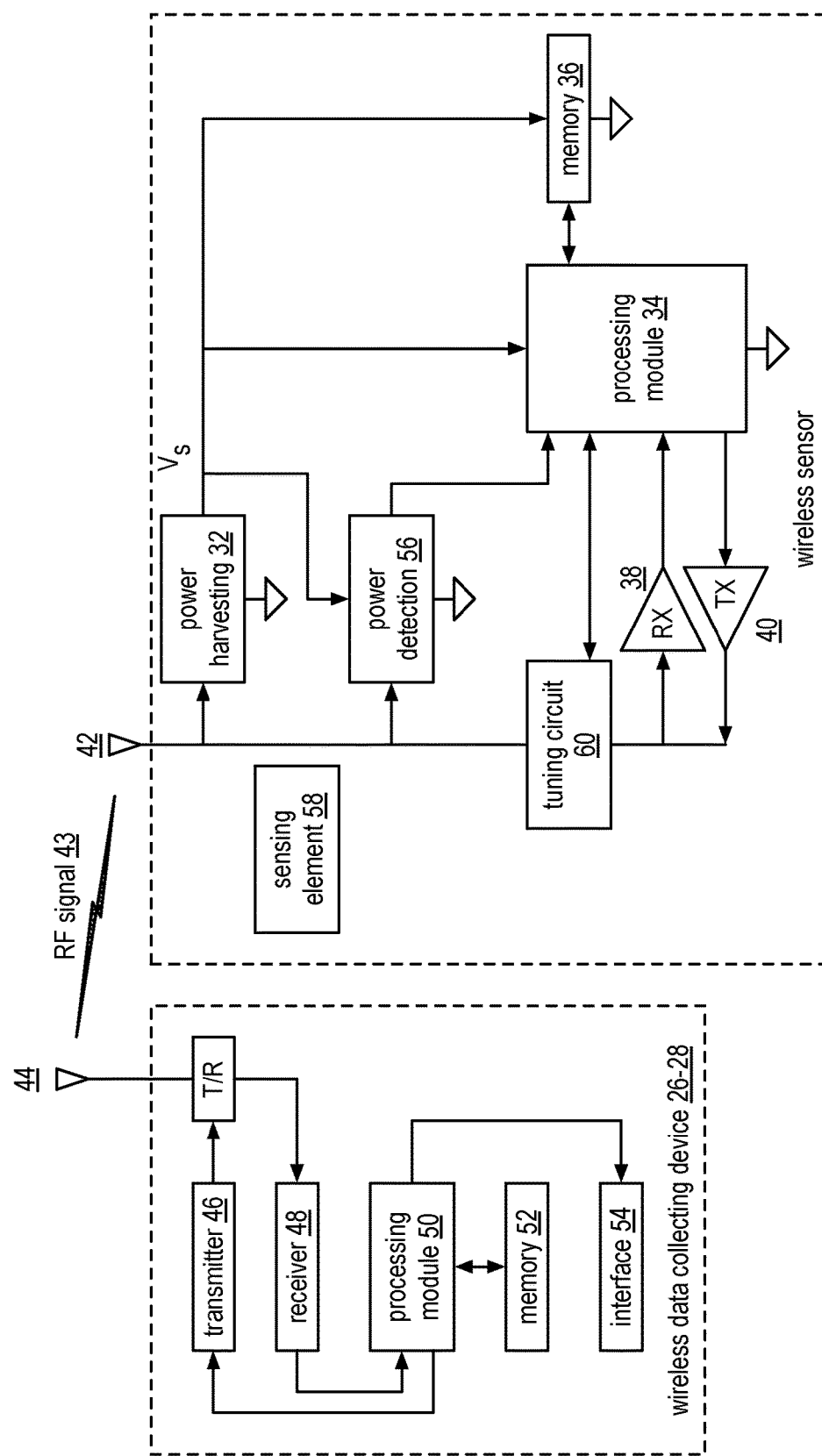
FIG. 3 is a schematic block diagram of another embodiment of a wireless data collecting device and a wireless device in accordance with the present invention.

FIG. 3 is a schematic block diagram of another embodiment of a wireless data collecting device 26-28 and a wireless device 18-24. The wireless device 18-24 includes a power harvesting circuit 32, a processing module 34, memory 36, a receiver section 38, a transmitter section 40, an antenna structure 42, a power detection circuit 56, a sensing element 58, and a tuning circuit 60. The wireless data collecting device includes an antenna structure 44, a transmitter 46, a receiver 48, a transmit/receive splitter or switch (T/R), a processing module 50, memory 52, and an interface 54. The interface 54 includes firmware (e.g., software and hardware) to communicate with the computing device 30 via a wired and/or wireless LAN and/or WAN.

In an example, the wireless device is a passive RFID tag used for sensing an environmental condition (e.g., moisture, temperature, pressure, humidity, altitude, sonic wave (e.g., sound), human contact, surface conditions, tracking, location, etc.) of an object (e.g., a box, a personal item (e.g., clothes, diapers, etc.), a pet, an automobile component, an article of manufacture, an item in transit, etc.). The sensing element 58 senses the environmental condition (e.g., moisture) and, as a result of the sensed condition, the sensing element affects the input impedance of the antenna structure 42 and/or of the tuning circuit 60 (e.g., a tank circuit that includes one or more capacitors and one or inductors having a resonant frequency corresponding to the carrier frequency of the RF signal 43).

The processing module 34 adjusts the resonant frequency of the tuning circuit 60 to compensate for the change in input impedance caused by the sensed environmental condition. The amount of adjustment is reflective of the level of the environmental condition (e.g., a little change corresponds to a little moisture; a large change corresponds to a large amount of moisture). The processing module 34 conveys this information to the reader via the transmitter and the antenna 42.

Before the processing module processes the sensed environmental condition, it processes a power level adjustment. For example, the power detection circuit 56 detects a power level of the received RF signal 43. In one embodiment, the processing module interprets the power level and communicates with the RFID reader to adjust the power level of the RF signal 43 to a desired level (e.g., optimal for accuracy in detecting the environmental condition). In another embodiment, the processing module includes the received power level data with the environmental sensed data it sends to the RFID reader so that the reader can factor the power level into the determination of the extent of the environmental condition.

Figure 4:
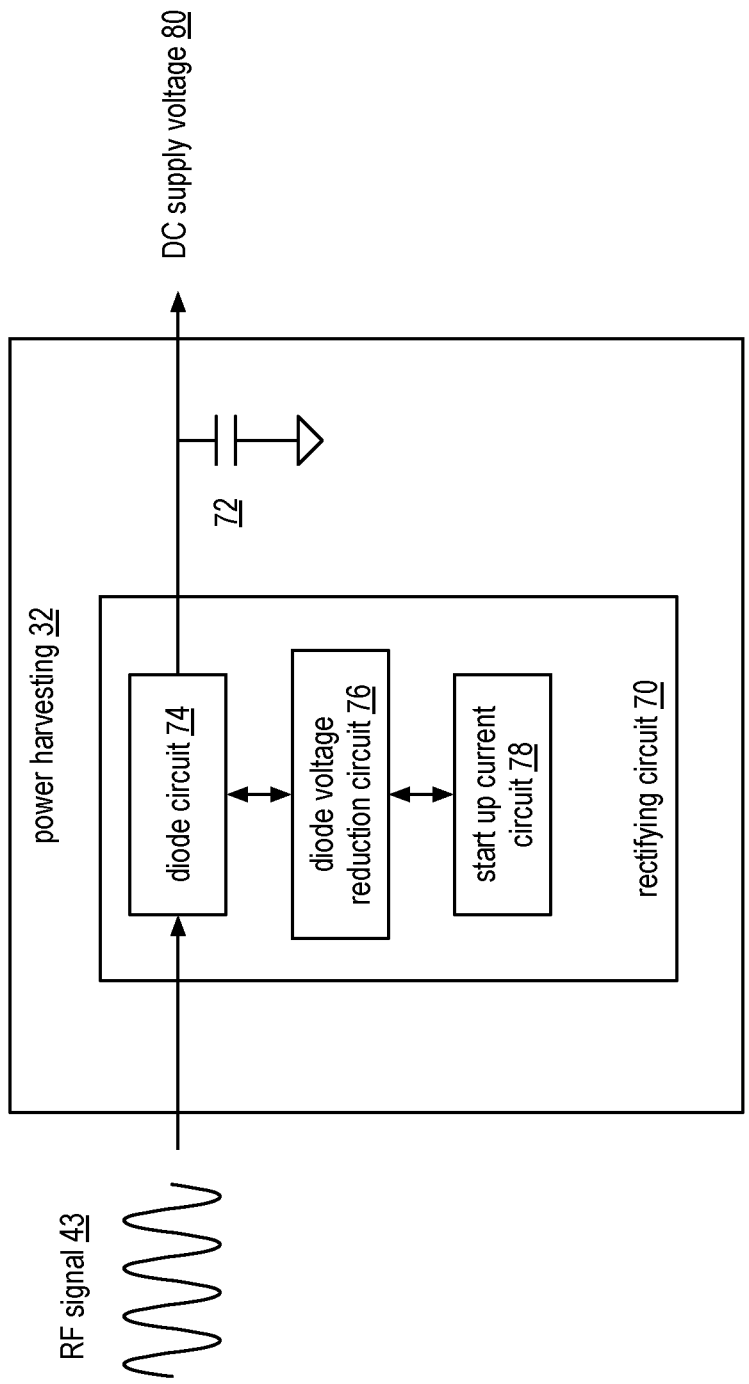
FIG. 4 is a schematic block diagram of an embodiment of a power harvesting circuit in accordance with the present invention.

FIG. 4 is a schematic block diagram of an embodiment of a power harvesting circuit 32 that includes a rectifying circuit 70 and a capacitor 72. The rectifier circuit 70 is operably coupled to convert the received RF signal 43 into a rectified signal. The capacitor 72, which includes one or more capacitors, filters the rectified signal to produce a DC supply voltage 80.

In general, the magnitude of the DC supply voltage 80 (e.g., Vout) is approximately equal to the peak voltage of the RF signal 43 (e.g., Vpeak) minus the voltage drop across the diode circuit 74 (e.g., Vdiode). As an equation, Vout=Vpeak−Vdiode. The efficiency of the power harvesting circuit 32 is the ratio of output power (e.g., Pout) to the input power (e.g., Pin). With power equaling current times voltage and the input current equaling the output current, the efficiency of the power harvesting circuit is approximately equal to (Vpeak−Vdiode)/Vpeak. Thus, the smaller Vdiode is, the greater the efficiency of the power harvesting circuit.

The rectifier circuit 70 includes a diode circuit 74, a diode voltage reduction circuit 76, and a start up current circuit 78. The diode circuit 74 is operable to pass a current when the received RF signal has a first polarity (e.g., positive polarity) and to substantially block the current when the received RF signal has a second polarity (e.g., negative polarity). The successive passing and blocking of the current creates the rectified signal.

The diode voltage reduction circuit 76 is operably coupled to reduce the voltage drop of the diode circuit from a first diode voltage drop (e.g., without the reduction circuit 76) to a second diode voltage drop (e.g., with the reduction circuit). Examples of the diode voltage reduction circuit 76 will be described with reference to FIG. 6.

The start up current circuit 78 is operably coupled to the diode voltage reduction circuit 76 and/or to the diode circuit 74. Due to the components of the diode circuit and/or the diode voltage reduction circuit there is a delay in starting the diode circuit and/or in starting the diode voltage reduction circuit. Further, the components of the diode circuit and/or the diode voltage reduction circuit require a start up current and a certain voltage level to become active. The start up current circuit 78 functions to reduce the start up time of the diode circuit and/or of the diode voltage reduction circuit and/or functions to reduce the start up current and/or voltage level requirements of the diode circuit and/or of the diode voltage reduction circuit. Examples of the start up current circuit 78 will be described with reference to FIG. 6.

Figure 5:
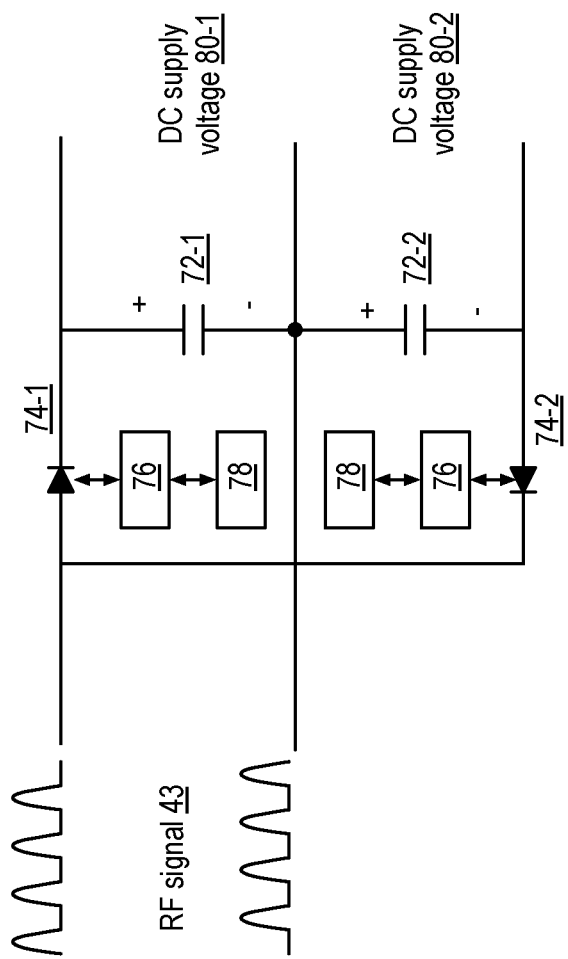
FIG. 5 is a schematic block diagram of an example embodiment of a power harvesting circuit in accordance with the present invention.

FIG. 5 is a schematic block diagram of an example embodiment of a power harvesting circuit 32 that includes two diode circuits 74-1 and 74-2, two diode voltage reduction circuits 76, two start up current circuits 78, and two capacitors 72-1 and 72-2. In this example, the diode circuits 74-1 and 74-2 are configured in a half bridge topology to produce a first DC supply voltage 80-1 and a second DC supply voltage 80-2. As another example, the first and second DC supply voltages are combined to produce one DC supply voltage. For each of the diode circuits 74-1 and 74-2, the corresponding diode voltage reduction circuit 76 and the corresponding start up current circuit 78 functions are described herein.

Figure 6:
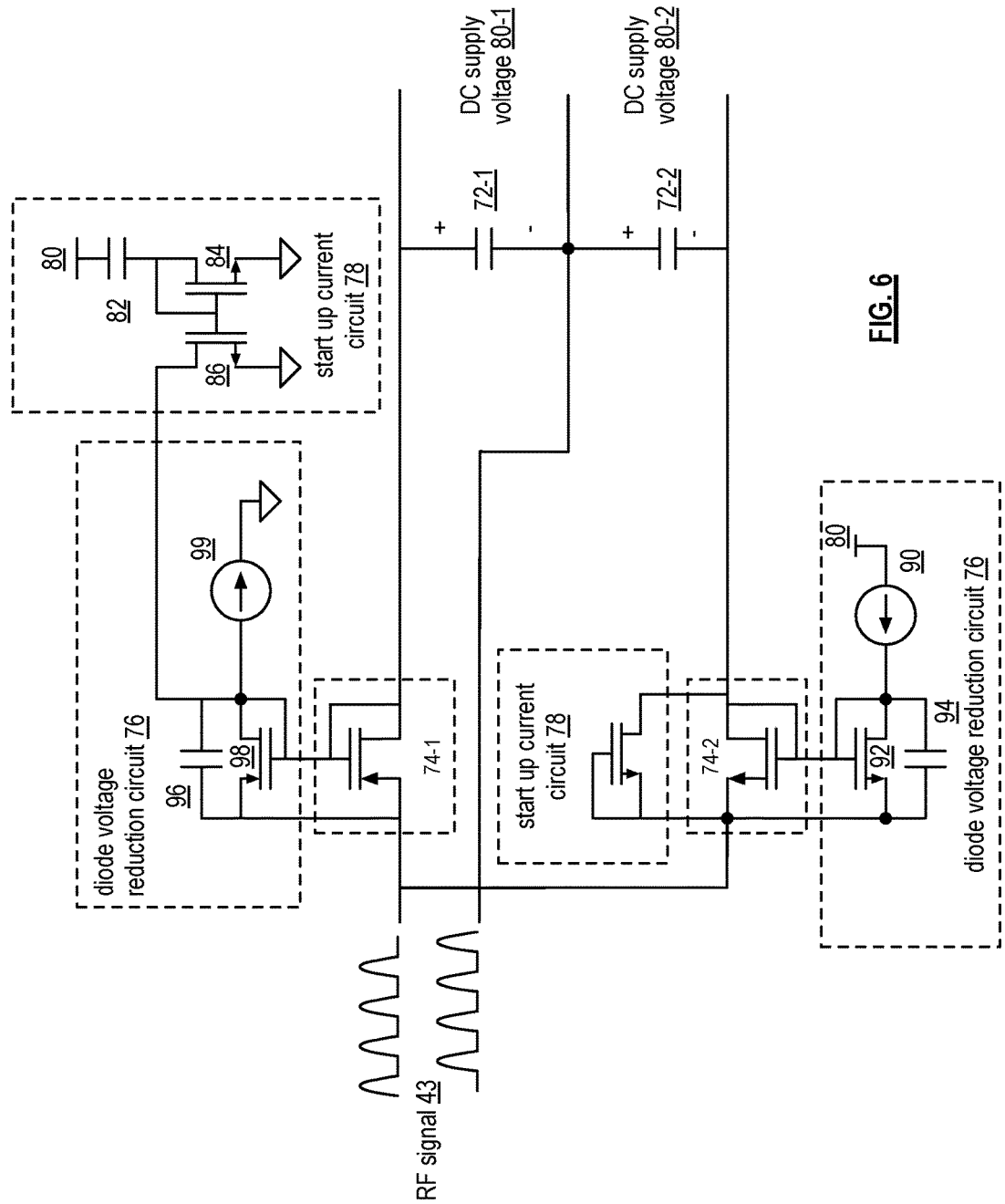
FIG. 6 is a schematic block diagram of another example embodiment of a power harvesting circuit in accordance with the present invention.

FIG. 6 is a schematic block diagram of another example embodiment of a power harvesting circuit 32 where diode circuit 74-1 is implemented as a P-channel MOSFET and diode circuit 74-2 is implemented as an N-channel MOSFET. The P-channel MOSFET and the N-channel MOSFET each have a minimum gate-source voltage to become active; each have an on-resistance, and each have a source-drain voltage when active. The source-drain voltage corresponds to the diode voltage drop of the diode circuit (e.g., Vdiode).

For the N-channel diode circuit 74-2, the diode voltage reduction circuit includes a battery or a fixed voltage generation circuit to provide a desired gate-source voltage to achieve a desired on-resistance and corresponding drain-source voltage. The example of FIG. 6 illustrates a fixed voltage generation circuit for the diode voltage reduction circuit 76 that includes a FET 92, a capacitor 94, and a current source 90. The FET (field effect transistor) has a gate, a drain, and a source and may be a mirrored and/or scaled version of the N-channel MOSFET of the diode circuit 74-2. The current source 90 is a fixed current source that provides a sufficient current to create a desired gate-source voltage of the FET, which in turn creates the desired gate-source voltage for the N-channel transistor of diode circuit 74-2. Note that one end of the current source is coupled to the supply voltage 80.

The start up current circuit 78 associated with the N-channel MOSFET of diode circuit 74-2 includes a native MOSFET transistor coupled as shown. As is known, a native MOSFET transistor is active when the gate-source voltage is zero. As such, it will reduce current to enable the diode circuit 74-1 and/or the current to enable the diode voltage reduction circuit 76 since both of the circuits include FET that have a non-zero gate-source activation voltage. In addition, or in the alternative, the native MOSFET transistor reduces start up time for the diode circuit and/or for the diode voltage reduction circuit 76 since it is active at very low voltages. The FETs of the diode circuit and the diode voltage reduction circuit are not active at the very low voltages.

For the P-channel diode circuit 74-1, the diode voltage reduction circuit 76 includes a battery or a fixed voltage generation circuit to provide a desired gate-source voltage to achieve a desired on-resistance and corresponding drain-source voltage. The example of FIG. 6 illustrates a fixed voltage generation circuit for the diode voltage reduction circuit 76 that includes a FET 98, a capacitor 96, and a current source 99. The FET (field effect transistor) has a gate, a drain, and a source and may be a mirrored and/or scaled version of the P-channel MOSFET of the diode circuit 74-1. The current source 99 is a fixed current source that provides a sufficient current to create a desired gate-source voltage of the FET, which in turn creates the desired gate-source voltage for the P-channel transistor of diode circuit 74-1. Note that one end of the current source is coupled to ground.

The start up current circuit 78 associated with the P-channel MOSFET of diode circuit 74-2 includes a temporary current boost circuit. The temporary current boost circuit includes a capacitor 82, a mirroring FET 84, and a FET 86 coupled as shown. At start up of the power harvesting circuit, the FETs 84 and 86 are enabled once the supply voltage reaches the gate-source voltage threshold of the FETs. When this occurs, the start up current circuit pulls down on the drain of the P-channel FET, causes it and the diode voltage reduction circuit 76 to become active. Accordingly, less current and/or faster start up times are achieved.

With the operations of the diode circuits 74, the diode voltage reduction circuits 76, and the start up current circuits 78 explained, the circuit of FIG. 6 operates similarly to the circuit of FIG. 5 to produce one or more DC supply voltages 80.

Figure 7:
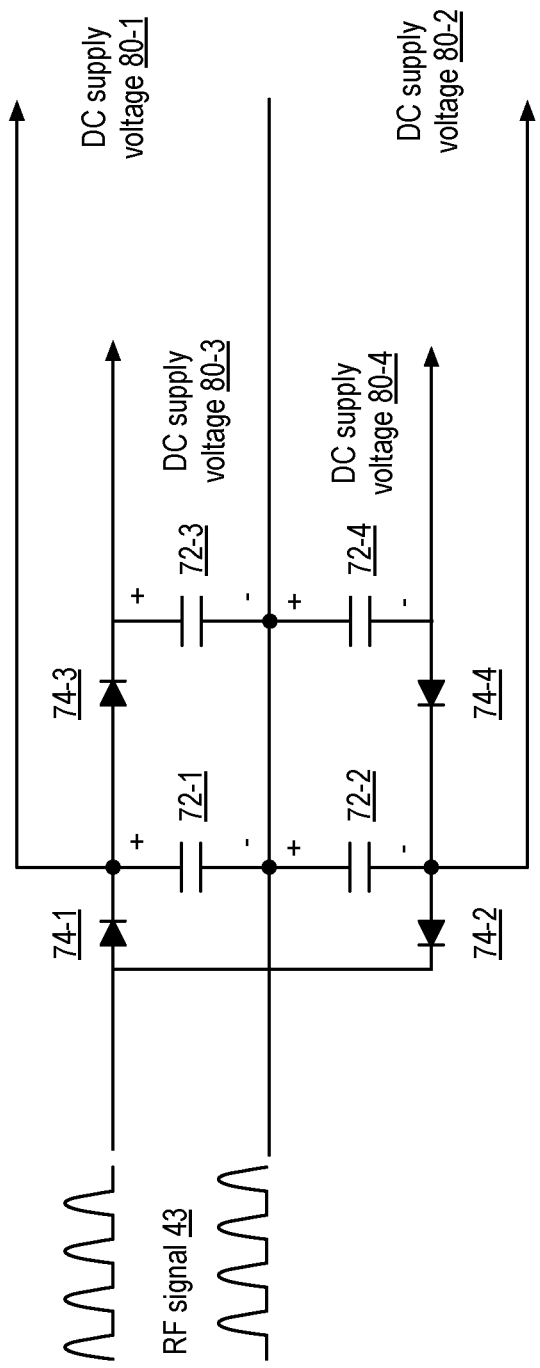
FIG. 7 is a schematic block diagram of another example embodiment of a power harvesting circuit in accordance with the present invention.

FIG. 7 is a schematic block diagram of another example embodiment of a power harvesting circuit 32 that includes four diode circuits 74-1 through 74-4, four diode voltage reduction circuits 76, four start up current circuits 78, and four capacitors 72-1 through 72-4. In this example, the diode circuits 74-1 and 74-2 are configured in a first half bridge topology to produce a first DC supply voltage 80-1 and a second DC supply voltage 80-2. The diode circuits 74-3 and 74-4 are configured in a second half bridge topology to produce a third DC supply voltage 80-3 and a fourth DC supply voltage 80-4.

The first and second DC supply voltages are approximately equal to Vpeak−Vdiode. The third and fourth DC supply voltages are approximately equal to Vpeak−2*Vdiode. Note that the supply voltages may be combined to produce other supply voltages. Further note that diode circuits 74-2 and 74-4 may be implemented using N-channel MOSFETS and the corresponding diode voltage reduction circuits 76 and corresponding start up current circuits 78 may be implemented as described with reference to FIG. 6. Still further note that diode circuits 74-1 and 74-3 may be implemented using P-channel MOSFETS and the corresponding diode voltage reduction circuits 76 and corresponding start up current circuits 78 may be implemented as described with reference to FIG. 6.

Figure 8:
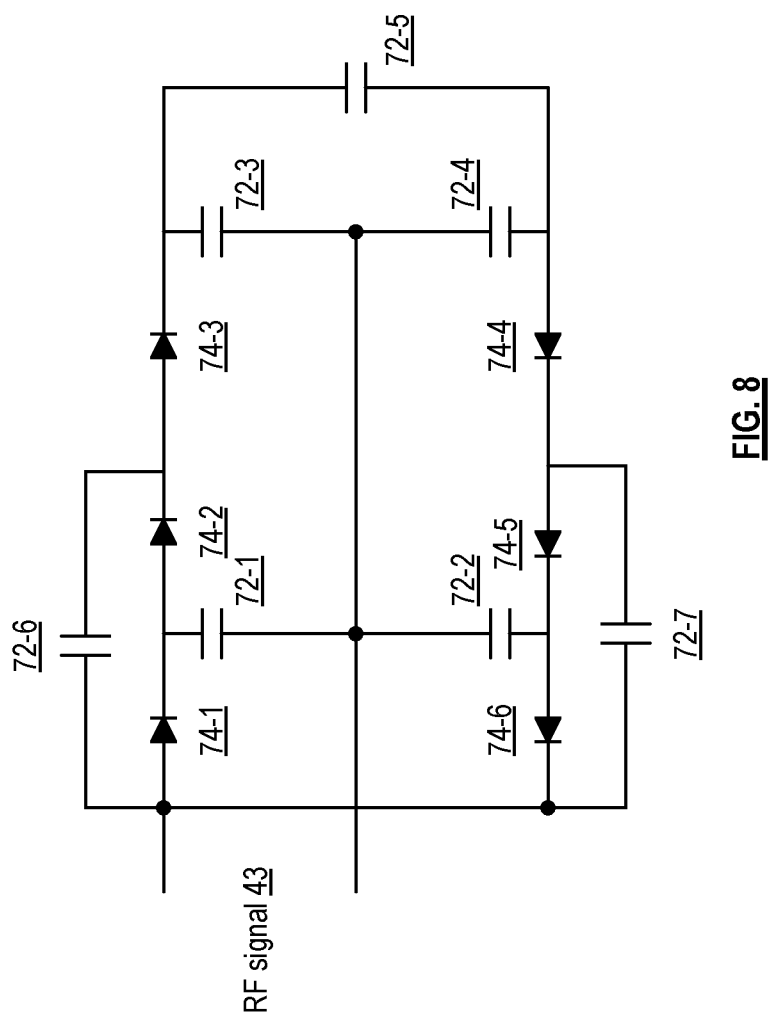
FIG. 8 is a schematic block diagram of another example embodiment of a power harvesting circuit in accordance with the present invention.

FIG. 8 is a schematic block diagram of another example embodiment of a power harvesting circuit 32 that includes six diode circuits 74-1 through 74-6, six diode voltage reduction circuits 76 (not shown for clarity), six start up current circuits 78 (not shown for clarity), and seven capacitors 72-1 through 72-7. In this example, the voltages created across each of the capacitors represents a DC supply voltage that may be used in combination to produce one or more desired DC supply voltages. Note that diode circuits 74-2, 74-4, and 74-6 may be implemented using N-channel MOSFETS and the corresponding diode voltage reduction circuits 76 and corresponding start up current circuits 78 may be implemented as described with reference to FIG. 6. Further note that diode circuits 74-1, 74-3, and 74-5 may be implemented using P-channel MOSFETS and the corresponding diode voltage reduction circuits 76 and corresponding start up current circuits 78 may be implemented as described with reference to FIG. 6.

FIG. 9 is a schematic block diagram of another example embodiment of a power harvesting circuit 32 that includes four diode circuits 74-1 through 74-4, four diode voltage reduction circuits 76 (not shown), four start up current circuits 78 (not shown), and one capacitor 72. In this example, the diode circuits 74-1 through 74-4 are configured in a full bridge topology to produce a DC supply voltage 80, which is approximately equal to Vpeak−2*Vdiode. Note that diode circuits 74-2 and 74-4 may be implemented using N-channel MOSFETS and the corresponding diode voltage reduction circuits 76 and corresponding start up current circuits 78 may be implemented as described with reference to FIG. 6. Still further note that diode circuits 74-1 and 74-3 may be implemented using P-channel MOSFETS and the corresponding diode voltage reduction circuits 76 and corresponding start up current circuits 78 may be implemented as described with reference to FIG. 6.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A power harvesting circuit comprises:
a rectifier circuit operably coupled to convert a received radio frequency (RF) signal into a rectified signal, the rectifier circuit includes:
   a diode circuit operable to pass a current when the received RF signal has a first polarity and to substantially block the current when the received RF signal has a second polarity, wherein the rectified signal is based on the passing and blocking of the current;
   a diode voltage reduction circuit operably coupled to the diode circuit, wherein the diode circuit has a first diode voltage drop and wherein the diode voltage reduction circuit reduces the first diode voltage drop to a second diode voltage drop; and
a capacitor operably coupled to convert the rectified signal into a direct current (DC) supply voltage, wherein a magnitude of the DC supply voltage is based on a peak voltage of the received RF signal and a diode voltage drop.

2. The power harvesting circuit of claim 1, wherein the diode voltage reduction circuit comprises at least one of:
a fixed voltage generation circuit; and
a battery.

3. The power harvesting circuit of claim 2, wherein the fixed voltage generation circuit comprises:
a field effect transistor (FET) having a gate, a drain, and a source, wherein the source is coupled to a first connection point of the diode circuit and the gate is coupled to a second connection point of the diode circuit and to the drain;
a capacitor coupled to the source and the drain; and
a current source coupled to the drain and to a voltage reference.

4. The power harvesting circuit of claim 1 comprises:
the diode circuit includes an N-channel metal oxide semiconductor field effect transistor (MOSFET) having a first gate, a first drain, and a first source; and
the diode voltage reduction circuit includes:
   a second N-channel MOSFET having a second gate, a second drain, and a second source, wherein the second source is coupled to the first source and the second gate is coupled to first gate and to the second drain;
   a capacitor coupled to the second source and the second drain; and
   a current source coupled to the second drain and to a voltage reference.

5. The power harvesting circuit of claim 1 comprises:
the diode circuit includes a P-channel metal oxide semiconductor field effect transistor (MOSFET) having a first gate, a first drain, and a first source; and
the diode voltage reduction circuit includes:
   a second P-channel MOSFET having a second gate, a second drain, and a second source, wherein the second source is coupled to the first source and the second gate is coupled to first gate;
   a capacitor coupled to the second source and the second drain; and
   a current source coupled to the second drain and to a voltage reference.

6. A power harvesting circuit comprises:
a rectifier circuit operably coupled to convert a received radio frequency (RF) signal into a rectified signal, the rectifier circuit includes:
   a diode circuit operable to pass a current when the received RF signal has a first polarity and to substantially block the current when the received RF signal has a second polarity, wherein the rectified signal is based on the passing and blocking of the current; and
   a start up current circuit operably coupled to the diode circuit, wherein the diode circuit has at least one of a first start up current and a first start up delay and wherein the start up current circuit reduces the at least one of a first start up current and a first start up delay to at least one of a second start up current and a second start up delay; and
a capacitor operably coupled to convert the rectified signal into a direct current (DC) supply voltage, wherein a magnitude of the DC supply voltage is based on a peak voltage of the received RF signal and a diode voltage drop.

7. The power harvesting circuit of claim 6, wherein the start up current circuit comprises at least one of:
a native metal oxide semiconductor field effect transistor (MOSFET) having a gate, a drain, and a source, wherein the gate is coupled to the source, wherein the drain is coupled to a first connection point of the diode circuit, and wherein the source is coupled to a second connection point of the diode circuit; and
a temporary current boost circuit.

8. The power harvesting circuit of claim 7, wherein the temporary current boost circuit comprises:
a capacitor;
a mirroring field effect transistor (FET) having a mirror gate, a mirror drain, and a mirror source; and
a field effect transistor (FET) having a gate, a drain, and a source, wherein the source and the mirror source are coupled to a first voltage reference, wherein the drain is coupled to the diode circuit, wherein the gate, the mirror gate, and the mirror drain are coupled to a first node of the capacitor, and wherein a second node of the capacitor is coupled to a second voltage reference.

9. The power harvesting circuit of claim 6 comprises:
the diode circuit includes an N-channel metal oxide semiconductor field effect transistor (MOSFET) having a first gate, a first drain, and a first source; and
the start up current circuit includes a native MOSFET having a native gate, a native drain, and a native source, wherein the native gate is coupled to the native source, wherein the native drain is coupled to the first drain, and the native source is coupled to the first source.

10. The power harvesting circuit of claim 6 comprises:
the diode circuit includes a P-channel metal oxide semiconductor field effect transistor (MOSFET) having a first gate, a first drain, and a first source; and
the start up current circuit includes:
   a second capacitor;
   a mirroring field effect transistor (FET) having a mirror gate, a mirror drain, and a mirror source; and
   a field effect transistor (FET) having a third gate, a third drain, and a third source, wherein the third source and the mirror source are coupled to a first voltage reference, wherein the third drain is coupled to the diode circuit, wherein the third gate, the mirror gate, and the mirror drain are coupled to a first node of the second capacitor, and wherein a second node of the second capacitor is coupled to a second voltage reference.

11. A wireless device comprises:
an antenna structure operable to receive a radio frequency (RF) signal;
a power harvesting circuit including:
   a rectifier circuit operably coupled to convert the RF signal into a rectified signal, the rectifier circuit includes:
      a diode circuit operable to pass a current when the received RF signal has a first polarity and to substantially block the current when the received RF signal has a second polarity, wherein the rectified signal is based on the passing and blocking of the current;
      a diode voltage reduction circuit operably coupled to the diode circuit, wherein the diode circuit has a first diode voltage drop and wherein the diode voltage reduction circuit reduces the first diode voltage drop to a second diode voltage drop; and
   a capacitor operably coupled to convert the rectified signal into a direct current (DC) supply voltage, wherein a magnitude of the DC supply voltage is based on a peak voltage of the received RF signal and a diode voltage drop;
a processing module;
memory;
a transmitter; and
a receiver, wherein the processing module, the memory, the transmitter, and the receiver are powered by the DC supply voltage.

12. The wireless device of claim 11, wherein the diode voltage reduction circuit comprises at least one of:
a fixed voltage generation circuit; and
a battery.

13. The wireless device of claim 12, wherein the fixed voltage generation circuit comprises:
a field effect transistor (FET) having a gate, a drain, and a source, wherein the source is coupled to a first connection point of the diode circuit and the gate is coupled to a second connection point of the diode circuit and to the drain;
a capacitor coupled to the source and the drain; and
a current source coupled to the drain and to a voltage reference.

14. The wireless device of claim 11 further comprises:
the diode circuit includes an N-channel metal oxide semiconductor field effect transistor (MOSFET) having a first gate, a first drain, and a first source; and
the diode voltage reduction circuit includes:
   a second N-channel MOSFET having a second gate, a second drain, and a second source, wherein the second source is coupled to the first source and the second gate is coupled to first gate;
   a capacitor coupled to the second source and the second drain; and
   a current source coupled to the second drain and to a voltage reference.

15. The wireless device of claim 11 further comprises:
the diode circuit includes a P-channel metal oxide semiconductor field effect transistor (MOSFET) having a first gate, a first drain, and a first source; and
the diode voltage reduction circuit includes:
   a second P-channel MOSFET having a second gate, a second drain, and a second source, wherein the second source is coupled to the first source and the second gate is coupled to first gate and to the second drain;
   a capacitor coupled to the second source and the second drain; and
   a current source coupled to the second drain and to a voltage reference.

16. A wireless device comprises:
an antenna structure operable to receive a radio frequency (RF) signal;
a power harvesting circuit including:
   a rectifier circuit operably coupled to convert the RF signal into a rectified signal, the rectifier circuit includes:
      a diode circuit operable to pass a current when the received RF signal has a first polarity and to substantially block the current when the received RF signal has a second polarity, wherein the rectified signal is based on the passing and blocking of the current;
      a start up current circuit operably coupled to the diode circuit, wherein the diode circuit has at least one of a first start up current and a first start up delay and wherein the start up current circuit reduces the at least one of a first start up current and a first start up delay to at least one of a second start up current and a second start up delay; and
   a capacitor operably coupled to convert the rectified signal into a direct current (DC) supply voltage, wherein a magnitude of the DC supply voltage is based on a peak voltage of the received RF signal and a diode voltage drop;
a processing module;
memory;
a transmitter; and
a receiver, wherein the processing module, the memory, the transmitter, and the receiver are powered by the DC supply voltage.

17. The wireless device of claim 16, wherein the start up current circuit comprises at least one of:
a native metal oxide semiconductor field effect transistor (MOSFET) having a gate, a drain, and a source, wherein the gate is coupled to the source, wherein the drain is coupled to a first connection point of the diode circuit, and wherein the source is coupled to a second connection point of the diode circuit; and
a temporary current boost circuit.

18. The wireless device of claim 17, wherein the temporary current boost circuit comprises:
a capacitor;
a mirroring field effect transistor (FET) having a mirror gate, a mirror drain, and a mirror source; and
a field effect transistor (FET) having a gate, a drain, and a source, wherein the source and the mirror source are coupled to a first voltage reference, wherein the drain is coupled to the diode circuit, wherein the gate, the mirror gate, and the mirror drain are coupled to a first node of the capacitor, and wherein a second node of the capacitor is coupled to a second voltage reference.

19. The wireless device of claim 16 further comprises:

the diode circuit includes an N-channel metal oxide semiconductor field effect transistor (MOSFET) having a first gate, a first drain, and a first source; and the start up current circuit includes a native MOSFET having a native gate, a native drain, and a native source, wherein the native gate is coupled to the native source, wherein the native drain is coupled to the first drain, and the native source is coupled to the first source.

20. The wireless device of claim 16 further comprises:

the diode circuit includes a P-channel metal oxide semiconductor field effect transistor (MOSFET) having a first gate, a first drain, and a first source; and the start up current circuit includes:

a second capacitor;

a mirroring field effect transistor (FET) having a mirror gate, a mirror drain, and a mirror source; and a field effect transistor (FET) having a third gate, a third drain, and a third source, wherein the third source and the mirror source are coupled to a first voltage reference, wherein the third drain is coupled to the diode circuit, wherein the third gate, the mirror gate, and the mirror drain are coupled to a first node of the second capacitor, and wherein a second node of the second capacitor is coupled to a second voltage reference.

* * * * *